US011475871B2

(12) United States Patent
Hwang et al.

(10) Patent No.: US 11,475,871 B2
(45) Date of Patent: Oct. 18, 2022

(54) DEVICE FOR REDUCING NOISE USING SOUND META-MATERIAL

(71) Applicants: Hyundai Motor Company, Seoul (KR); Kia Motors Corporation, Seoul (KR); AJOU UNIVERSITY INDUSTRY-ACADEMIC COOPERATION FOUNDATION, Suwon-si (KR)

(72) Inventors: Jin Ho Hwang, Seoul (KR); Dae Ig Jung, Suwon-si (KR); Min Ho Cho, Suwon-si (KR); Seung Hyeok Chang, Suwon-si (KR); Jin Woo Lee, Suwon-si (KR); Jong Kyeom Lee, Suwon-si (KR); Min Ho Kim, Suwon-si (KR)

(73) Assignees: Hyundai Motor Company, Seoul (KR); Kia Motors Corporation, Seoul (KR); Ajou University Industry-Academic Cooperation Foundation, Suwon-si (KR)

( * ) Notice: Subject to any disclaimer, the term of this patent is extended or adjusted under 35 U.S.C. 154(b) by 482 days.

(21) Appl. No.: 16/506,699

(22) Filed: Jul. 9, 2019

(65) Prior Publication Data

US 2020/0126531 A1 Apr. 23, 2020

(30) Foreign Application Priority Data

Oct. 22, 2018 (KR) .......................... 10-2018-0125949

(51) Int. Cl.
*G10K 11/168* (2006.01)
*B32B 5/02* (2006.01)
(Continued)

(52) U.S. Cl.
CPC .............. *G10K 11/168* (2013.01); *B32B 3/20* (2013.01); *B32B 5/022* (2013.01); *B32B 5/18* (2013.01);
(Continued)

(58) Field of Classification Search
CPC ........ B32B 2250/03; B32B 2262/0284; B32B 2266/0278; B32B 2307/102; B32B 2307/558; B32B 27/065; B32B 27/12; B32B 27/308; B32B 27/36; B32B 3/20; B32B 5/022; B32B 5/18; B32B 2307/56; B32B 2307/732; B32B 2605/00; B32B 27/302; B32B 27/32; B32B 27/365;
(Continued)

(56) References Cited

U.S. PATENT DOCUMENTS

2013/0118831 A1* 5/2013 Kawai .................. G10K 11/168
181/290

FOREIGN PATENT DOCUMENTS

KR 20160039495 A 4/2016

* cited by examiner

*Primary Examiner* — Yan Lan
(74) *Attorney, Agent, or Firm* — Slater Matsil, LLP

(57) ABSTRACT

Disclosed herein is a device for reducing noise using a sound meta-material. The device for reducing noise includes a sound-absorbing layer configured to absorb noise generated from a sound source, a buffer layer configured to buffer an impact, and a meta-material panel layer disposed between the sound-absorbing layer and the buffer layer. The meta-material panel layer is configured with a unit cell formed by stacking one or more block cells, and one or more unit cells are disposed on a plane of the meta-material panel layer.

20 Claims, 6 Drawing Sheets

(51) Int. Cl.
  *B32B 5/18* (2006.01)
  *B32B 27/06* (2006.01)
  *B32B 27/12* (2006.01)
  *B32B 27/30* (2006.01)
  *B32B 27/36* (2006.01)
  *B32B 3/20* (2006.01)

(52) U.S. Cl.
  CPC ............ *B32B 27/065* (2013.01); *B32B 27/12* (2013.01); *B32B 27/308* (2013.01); *B32B 27/36* (2013.01); *B32B 2250/03* (2013.01); *B32B 2262/0284* (2013.01); *B32B 2266/0278* (2013.01); *B32B 2307/102* (2013.01); *B32B 2307/558* (2013.01)

(58) Field of Classification Search
  CPC ......... B32B 3/266; B32B 5/02; G10K 11/168; G10K 11/16; G10K 2210/3214; G10K 2210/3223; G10K 2210/3224
  See application file for complete search history.

DEVICE FOR REDUCING NOISE USING SOUND META-MATERIAL

CROSS-REFERENCE TO RELATED APPLICATIONS

This application claims priority to Korean Patent Application No. 10-2018-0125949, filed on Oct. 22, 2018, which application is hereby incorporated herein by reference.

TECHNICAL FIELD

The present disclosure relates to a device for reducing noise using a sound meta-material.

BACKGROUND

Since a device for reducing noise alleviates various noises, the device for reducing noise is used in a variety of fields such as lecture rooms, performance halls, industrial sites, public transportation, and the like.

Further, efforts have been made to improve driving ability of a driver by preventing introduction of engine noise of a vehicle, road surface noise, and the like into the vehicle.

The above-described device for reducing noise conventionally employs a sound-absorbing plate or a sound insulation plate so that the sound-absorbing plate and the sound insulation plate are manufactured using a porous fiber material or the principle of a Helmholtz resonator. A problem of the conventional device for reducing noise is that there is a disadvantage in which the sound-absorbing plate and the sound insulation plate should be made thick in order to cut off up to a low frequency band.

Further, since the device for reducing noise is adhered to a hard wall or floor from which sound waves are reflected, when a thickness of the sound-absorbing plate made of a porous fiber material is very thin as compared to a wavelength of a sound wave, sound absorption efficiency is degraded because energy of the sound wave is not efficiently attenuated such that the sound-absorbing plate made of a porous fiber material should be thickened so as to absorb a low frequency band.

Such a thick device for reducing noise is also applied to a configuration using the principle of the Helmholtz resonator. That is, until now there is no device for reducing noise, which has a significantly thin thickness than a wavelength of a sound wave.

Korean Patent Laid-Open Publication No. 10-2016-0039495 discloses subject matter that is related to subject matter disclosed herein.

The above information disclosed in this Background section is only for enhancement of understanding of the background of the invention and therefore it may contain information that does not form the prior art that is already known in this country to a person of ordinary skill in the art.

SUMMARY

The present disclosure relates to a device for reducing noise using a sound meta-material. Particular embodiments relate to a device for reducing noise introduced into an indoor space from an external sound source by forming a meta-material panel layer in which unit cells, which are located between a sound-absorbing layer and a buffer layer and are configured with in a plurality of single cells, are disposed in parallel.

The present invention employs a sound meta-material, and the sound meta-material has an artificial structure with an efficiency density and an effective volumetric elastic modulus which exceed ranges of a density and an effective volume elastic modulus for which a fluid existing in nature can have. The sound meta-material has a structure in which unit elements of the sound meta-material are disposed in a form of an array in a fluid.

Further, the sound meta-material has a physical property of a Poisson's ratio with respect to a sound such that the sound meta-material can be used as a sound insulation plate for blocking a sound wave.

It is possible to manufacture a sound medium having a property, which is not exhibited by a material existing in nature, using such a sound meta-material such that an acoustic transparent cloak, an acoustic super lens, a sound-absorbing plate, a sound insulation plate, an exhaust silencer, and the like have been developed.

Specifically, when a meta-material having an effective volume elastic modulus as compared to air is used, it is possible to significantly improve performance of a sound-absorbing plate, a sound insulation plate, and an exhaust silencer.

However, even in the case of a sound-absorbing material using a meta-material, it is required to secure stiffness according to a use environment, and a shape characteristic of the meta-material is required according to a frequency band in which noise and vibration are generated.

Embodiments of the present invention can solve the above-described problems associated with prior art.

In one aspect, the present invention provides a meta-material panel layer for blocking a sound of an externally located sound source.

In another aspect, the present invention provides a device for reducing noise, which is capable of selectively cutting off a frequency band of a sound source by providing an annular cavity of a unit cell constituting a meta-material panel layer.

In still another aspect, the present invention provides a noise reduction effect through bonding of thin unit cells, as well as a thin sound insulation layer.

Objectives of the present invention are not limited to the above-described objectives, and other objectives of the present invention, which are not mentioned, can be understood by the following description and also will be apparently understood through embodiments of the present invention. Further, the objectives of the present invention can be implemented by means described in the appended claims and a combination thereof.

The device for reducing noise using a sound meta-material for achieving the objectives of the present invention includes the following configuration.

In a preferred embodiment, a device for reducing noise using a sound meta-material includes a sound-absorbing layer for absorbing noise generated from a sound source, a buffer layer for buffering an impact, and a meta-material panel layer disposed between a polyethylene terephthalate (PET) felt and a polyurethane (PU) foam layer. The meta-material panel layer is configured with a unit cell formed by stacking one or more block cells, and one or more unit cells are disposed on a plane of the meta-material panel layer.

The block cell may include a center hole and an annular cavity therein.

The block cell may include a first panel and a third panel, each of which include the center hole, and a second panel disposed between the first panel and the third panel and including an opening for forming the annular cavity.

The device may further include one or more reinforcements disposed at an inner opening of the second panel.

The unit cell may be configured by stacking one or more block cells to allow the center holes coincide with one other.

A thickness of the sound meta-material panel layer may be 20 mm or less.

The unit cell may be configured with a plurality of block cells, and the plurality of block cells may be formed to have different physical properties for blocking one or more frequency bands.

The meta-material panel layer may be configured with two or more unit cells, and the unit cells are disposed on a plane of the meta-material panel layer at regular intervals.

The unit cell may be configured with four or more block cells which are stacked in a height direction.

The sound-absorbing layer may be made of polyethylene terephthalate (PET) felt.

The buffer layer may be made of a polyurethane (PU) foam.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
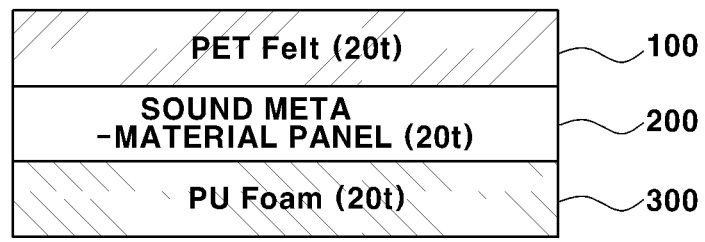
FIG. 1 is a block diagram of a device for reducing noise according to one embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter, embodiments of the present invention will be described in detail with reference to the accompanying drawings. The embodiments of the present invention can be modified in various forms, and the scope of the present invention should not be construed as being limited to the following embodiments. These embodiments are provided to more fully describe the present invention to those skilled in the art.

Further, the terms " . . . layer," " . . . part," " . . . cell," " . . . unit cell 210," and the like described in this disclosure mean a unit for processing at least one function or operation and may be implemented as hardware or a combination thereof.

Further, in this disclosure, the terms a first, a second, and the like are assigned to components so as to discriminate these components because names of the components are the same, but these terms are not necessarily limited to the order in the following description.

A device for reducing noise using a sound meta-material of the present invention provides a sound absorption effect and a sound insulation effect for preventing noise from being introduced into indoors from an externally located sound source and includes a buffer layer 300, a meta-material panel layer 200, and a sound-absorbing layer 100.

FIG. 1 illustrates a block diagram of the device for reducing noise according to one embodiment of the present invention. In FIG. 1, the device for reducing noise is configured such that the buffer layer 300 is disposed to be closest to a sound source which is a cause of noise, the meta-material panel layer 200 is disposed on the buffer layer 300, and the sound-absorbing layer 100 is stacked on the meta-material panel layer 200.

In another embodiment of the present invention, the device for reducing noise may be configured such that the sound-absorbing layer 100 is disposed to be closest to a sound source which is a cause of noise, the meta-material panel layer 200 is disposed on the buffer layer 300, and the buffer layer 300 stacked on the meta-material panel layer 200.

The buffer layer 300 is configured to absorb an impact generated and applied from the outside, and protect the meta-material panel layer 200 and the sound-absorbing layer 100 which are sequentially stacked on the buffer layer 300. In one embodiment of the present invention, the buffer layer 300 may be formed of a polyurethane (PU) foam.

The sound-absorbing layer 100 is configured to absorb noise generated from a sound source and introduced into indoors, thereby reducing the noise introduced into indoors. In one embodiment of the present invention, a polyethylene terephthalate (PET) felt may be used as the sound-absorbing layer 100.

The device for reducing noise according to the present invention includes the meta-material panel layer 200 disposed between the buffer layer 300 and the sound-absorbing layer 100. The meta-material panel layer 200 is formed by one or more unit cells 210 which are coupled in parallel on a plane.

The unit cell 210 may be configured by coupling of one or more block cells 220 and thus the unit cell 210 may be configured through the block cells 220 which are vertically coupled on a plane.

More preferably, in one embodiment of the present invention, four block cells 220 are coupled to form a single unit cell 210.

The unit cell 210 is configured such that the block cells 220 are coupled in series or in parallel in one direction or in multiple directions, and through the coupling of the coupled block cells 220, a band gap of a wave may be found and a plurality of frequencies in which waves are not transmitted may be formed such that it is possible to set a frequency band of interest for reducing noise through the block cells 220.

The meta-material constituting the block cell 220 may be made of at least one of acrylic or poly lactic acid (PLA), and in one embodiment of the present invention, the unit cell 210 formed through the coupling of four block cells 220 may be configured with a combination of block cells 220 formed of one or more of acryl or PLA.

In addition to acrylic and PLA, the meta-material of the present invention having a sound insulation effect may include all plastic materials such as polypropylene (PP), acrylonitrile butadiene styrene copolymer (ABS), polycarbonate (PC), and the like.

As described above, acryl and PLA may be configured to have different cut-off frequency bands, and the unit cell 210 including the block cells 220 made of acrylic and PLA may be configured to have different cut-off frequency bands according to a kind of the meta-material.

Hereinafter, configurations of the unit cell 210 and the block cell 220 for forming the meta-material panel layer 200 and the meta-material panel layer 200 will be described with reference to FIGS. 2 to 6.

Figure 2:
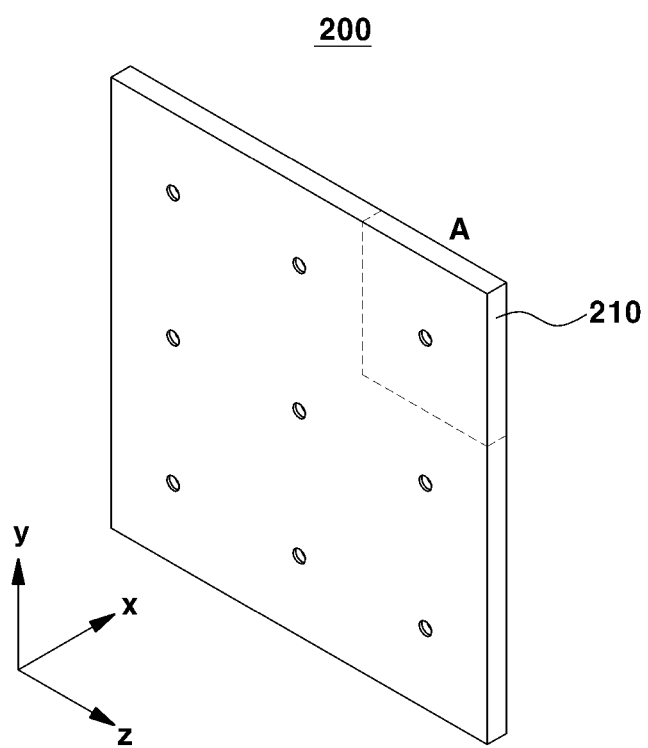
FIG. 2 is a perspective view of a meta-material panel layer according to one embodiment of the present invention.
Figure 3:
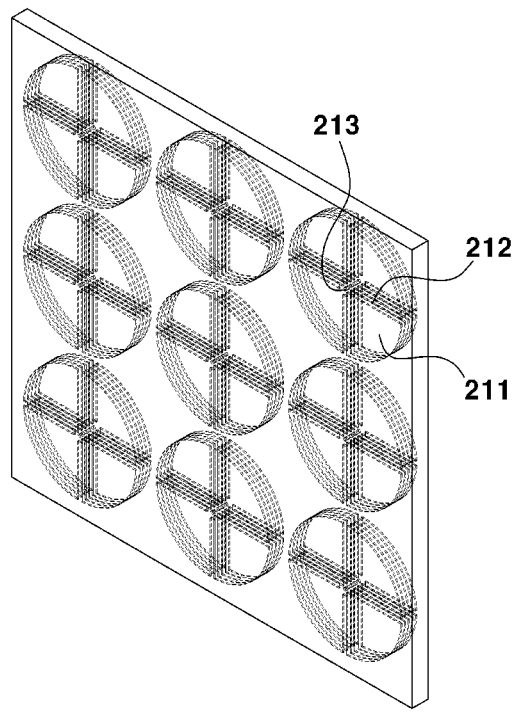
FIG. 3 is a structural view of the meta-material panel layer according to one embodiment of the present invention.

FIGS. 2 and 3 illustrate a perspective view and a three-dimensional picture of the meta-material panel layer 200 according to one embodiment of the present invention.

As shown in FIG. 2, the meta-material panel layer 200 is configured to maintain a planar shape. Further, in FIG. 3, the unit cells 210 are configured to be coupled to each other on the same plane so as to form the meta-material panel layer 200.

Further, as shown in FIG. 3, each of the unit cells 210 refers to a single unit formed through coupling a plurality of block cells 220, and the meta-material panel layer 200 may be configured through coupling of the unit cells 210 or to form an area within a panel.

More preferably, the meta-material panel layer 200 is configured by a plurality of unit cells 210, which are aligned in a vertical or horizontal direction on a plane, and thus the meta-material panel layer 200 may be formed to have a regular interval.

A single unit cell 210 may be configured by one or more block cells stacked in a vertical direction of the meta-material panel layer 200, and more preferably, four or more block cells are coupled to form the single unit cell 210.

The plurality of unit cells 210 constituting the meta-material panel layer 200 may be disposed in the vertical and horizontal directions on the plane to configure the meta-material panel layer 200, and the number of coupled unit cells 210 may be varied according to a size of the device for reducing noise.

Figure 4:
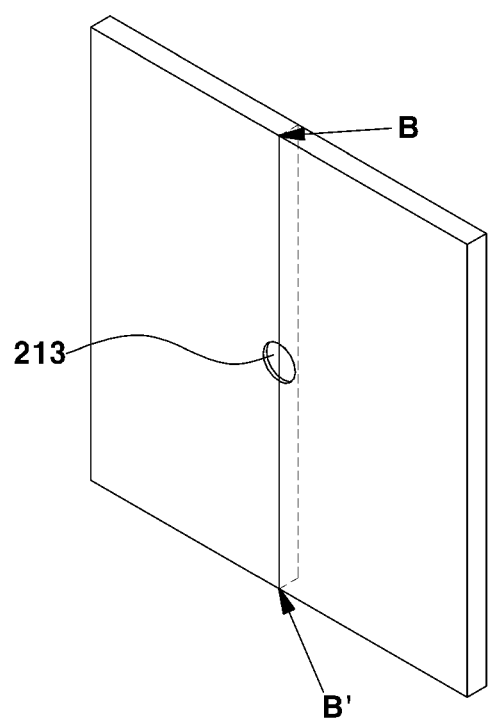
FIG. 4 is a perspective view of a unit cell constituting the meta-material panel layer according to one embodiment of the present invention.
Figure 5:
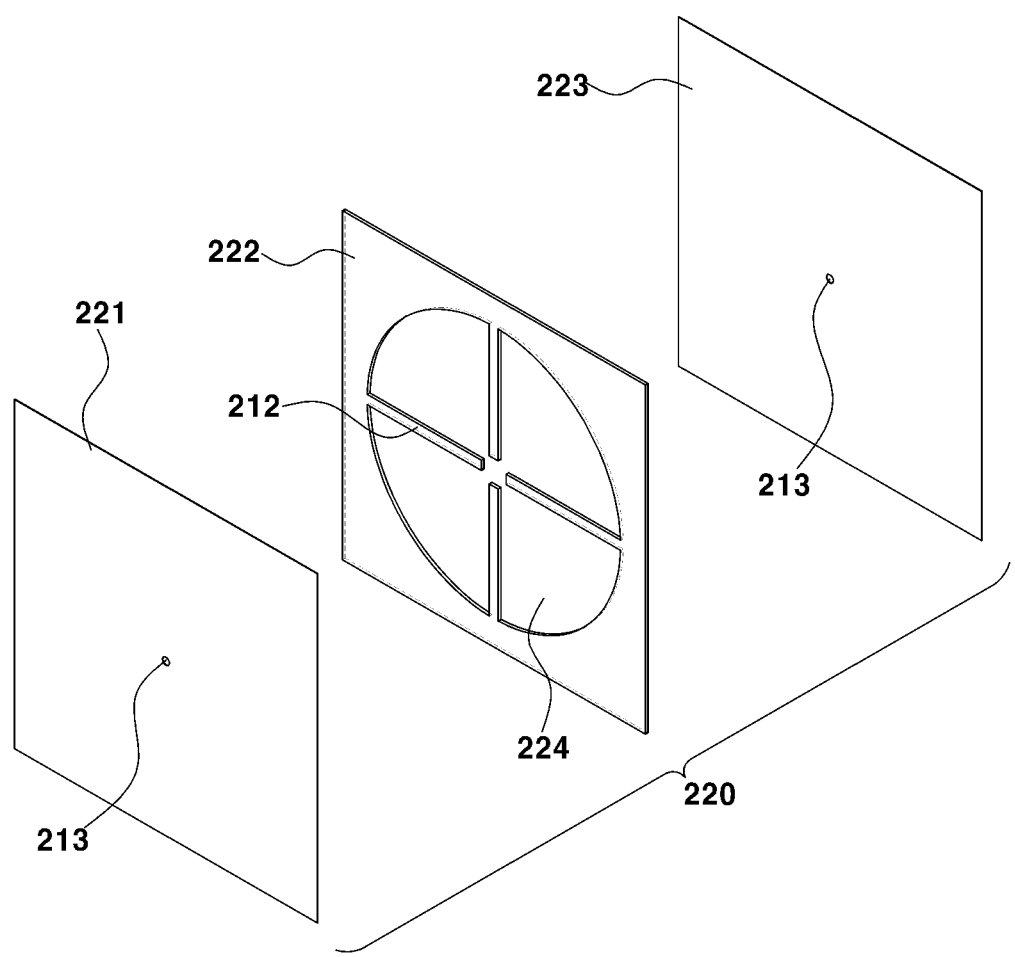
FIG. 5 is an exploded view of a block cell constituting the meta-material panel layer according to one embodiment of the present invention.
Figure 6:
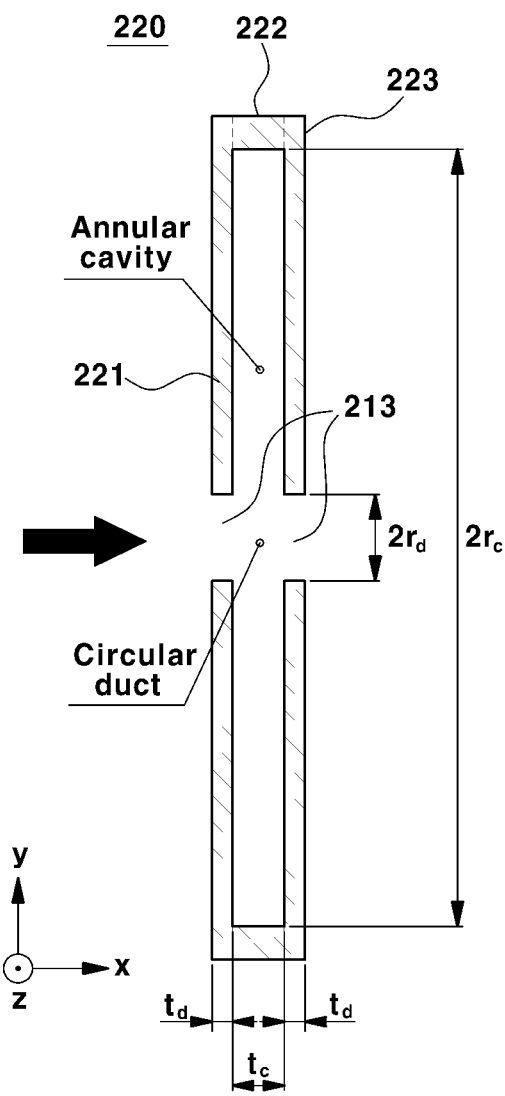
FIG. 6 is a cross-sectional view of the block cell constituting the meta-material panel layer according to one embodiment of the present invention.

FIGS. 4 to 6 illustrate the unit cell 210 and the block cell 220 forming the unit cell 210.

FIG. 4 is a perspective view of the unit cell 210 as Configuration A of the meta-material panel layer 200 of FIG. 1.

In FIG. 4, the unit cell 210 configured through stacking of the block cells 220 is shown, and the unit cell 210 has a structure in which one or more block cells are stacked.

Further, as shown in FIG. 5, a single block cell 220 constituting the unit cell 210 is configured with a stacked structure of a first panel 221, a second panel 222, and a third panel 223.

Each of the first panel 221 and the third panel 223 includes a center hole 213, and the second panel 222 includes an opening 224. More preferably, in the case of the first panel 221 and the third panel 223, the center hole 213 may be located at the center of each of the first panel 221 and the third panel 223 constituting the block cell 220. Further, the first panel 221 and the third panel 223 may be configured identically to each other.

In an assembly form in which the block cells are stacked, the center hole 213 is formed to have a shape passing through the first panel 221, the second panel 222, and the third panel 223, and the opening 224 of the second panel 222 is formed to have an annular cavity 211. Preferably, in one embodiment of the present invention, one or more reinforcements 212 located to extend to the opening 224 in the second panel 222 is further included.

As shown in the drawing, in one embodiment of the present invention, an assembly of a block cell 220 including four reinforcements 212 extending from an outer side of a panel to the annular cavity 211 in a direction of the center hole 213 is disclosed.

The reinforcement 212 serves to suppress vibration of the block cell 220 forming the meta-material panel layer 200, thereby being capable of preventing vibration generated in the device for reducing noise when blocking noise.

In one embodiment of the present invention, a cut-off frequency band may be set according to the center hole 213, a size of the annular cavity 211, and thicknesses of the first panel 221 to the third panel 223 constituting the block cell 220.

One or more block cells 220 in the form of the assembly formed as described above are stacked to form the unit cell 210, and in one embodiment of the present invention, four block cells 220 are stacked.

More preferably, a plurality of unit cells 210 are aligned to allow the center holes 213 formed are the block cells 220 to coincide with one other, and the plurality of unit cells 210 disposed in parallel on the plane are configured to be disposed in parallel in the vertical and horizontal directions of the plane of the meta-material panel layer 200 so as to allow the center holes 213 to form a regular interval.

In summary, the plurality of unit cells 210 forming the meta-material panel layer 200 are configured to be coupled in the vertical and horizontal directions of the meta-material panel layer 200 so as to have regular intervals on the plane.

FIG. 6 is a cross-sectional view taken along the line B-B' shown in FIG. 4 and illustrates a cross-section of an assembly of a single block cell 220, and a radius $r_d$ of the center hole 213, a radius $r_c$ of the annular cavity 211, a thickness $t_d$ of each of the first panel 221 and third panel 223, and a thickness $t_c$ of the annular cavity 211 formed by the second panel 222 are shown in FIG. 6.

A size of an outer diameter $2r_c$ of the annular cavity 211 of the block cell 220 is related to a bandwidth of a noise cut-off frequency, and as the outer diameter $2r_c$ of the annular cavity 211 increases, the bandwidth of the noise cut-off frequency decreases and a relative bandwidth (RBW) decreases.

In contrast, as the radius $r_d$ of the center hole 213 increases, there is a characteristic in which the bandwidth of the noise cut-off frequency decreases and the RBW increases.

In comparison, as the thickness $t_d$ of each of the first panel 221 and the third panel 223 increases, the bandwidth of the noise cut-off frequency decreases and the RBW exhibits an identical characteristic, and as the thickness $t_c$ of the annular cavity 211 formed by the second panel 222 increases, the bandwidth of the noise cut-off frequency increases and the RBW also increases.

In summary, the device for reducing noise of the present invention includes the first panel 221 and the third panel 223 as the block cell 220 and defines the annular cavity 211 through the second panel 222 such that the device for reducing noise provides an effect of attenuating a wavelength of the noise introduced from the noise source through pressure dropping by the annular cavity 211. That is, the block cell 220 made of a meta-material attenuates the wavelength of the noise source through a physical property of a sound.

As described above, the present invention provides a structure different from that a conventional noise blocking device through energy burning due to impedance mismatch such that the present invention provides a technique for reducing noise by the physical property of the sound through the coupling of the block cells 220 made of the meta-material.

According to one embodiment of the present invention, the device for reducing noise may set a noise cut-off frequency band by an outer diameter $2r_c$ of the annular cavity 211 of the block cell 220 and the radius $r_d$ of the center hole 213, and the noise cut-off frequency band is sensitively varied by the outer diameter $2r_c$ of the annular cavity 211 of the block cell 220 and the radius $r_d$ of the center hole 213 rather than the thickness $t_d$ of each of the first panel 221 to the third panel 223 constituting the block cell 220.

Figure 7:
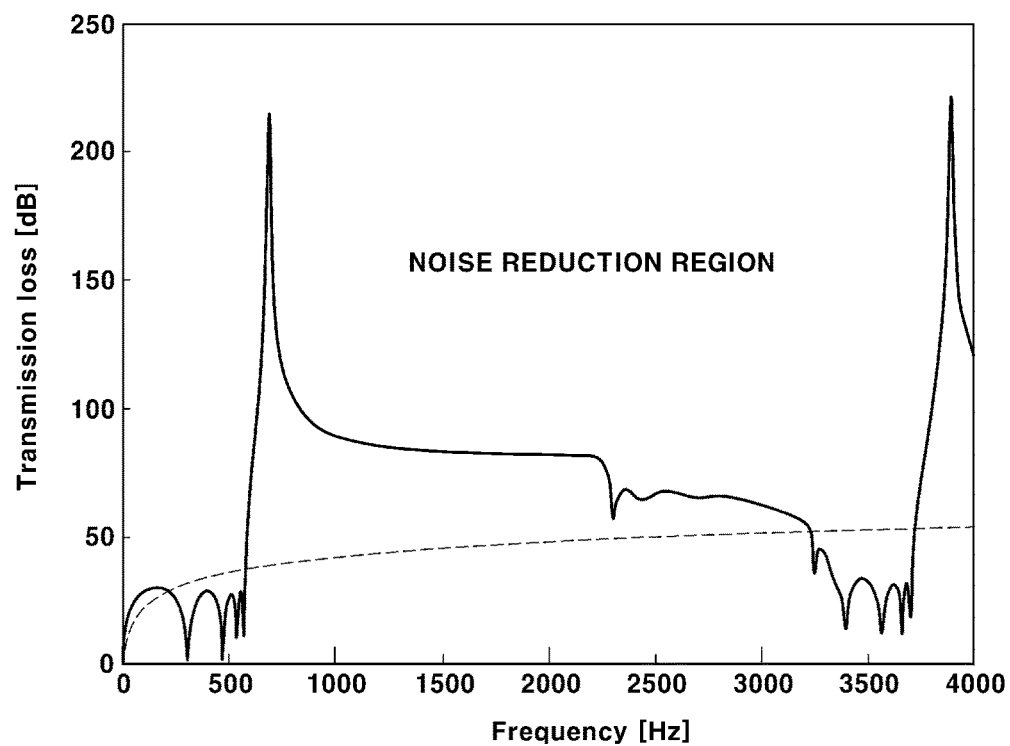
FIG. 7 is a graph showing a noise cut-off frequency band according to one embodiment of the present invention.

Referring to FIG. 7, the device for reducing noise is configured to have a lower limit frequency 300 Hz of the noise cut-off frequency band and an upper limit frequency 4000 Hz thereof on the basis of the above-described characteristic. More preferably, according to one embodiment of the present invention, the noise cut off frequency may have a frequency in the range of 272 Hz to 3219 Hz.

In order to have the above-described noise cut-off frequency band, the annular cavity 211 is configured to have the outer diameter $2r_c$ in the range of 90 mm to 130 mm and the center hole 213 is configured to have an outer diameter $2r_d$ in the range of 1 to 10 mm.

Further, in one embodiment of the present invention, the meta-material panel layer 200 may be formed to have a thickness of 20 mm or less, and the thickness $t_c+2t_d$ of the block cell 220 may be formed to have a thickness of 5 mm or less.

Accordingly, when the unit cell 210 including four block cells 220 is configured, the meta-material panel layer 200 may be configured to have a maximum thickness of 20 mm.

Figure 8:
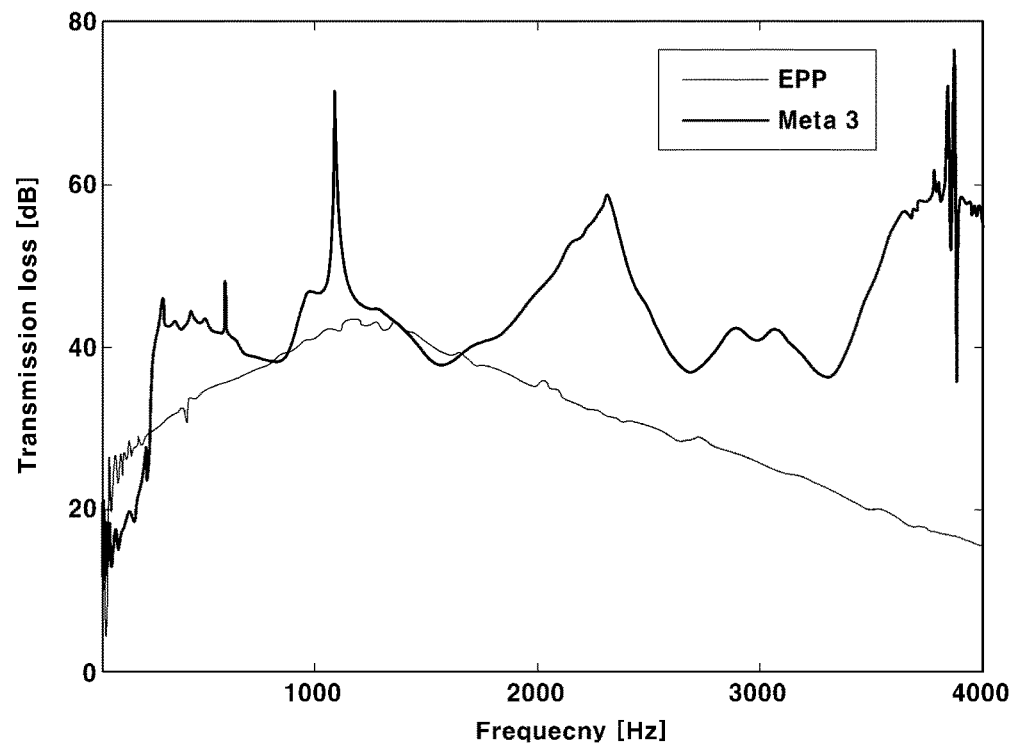
FIG. 8 is a graph showing sound insulation effect data of the unit cell of the present invention compared with a related art.
Figure 9:
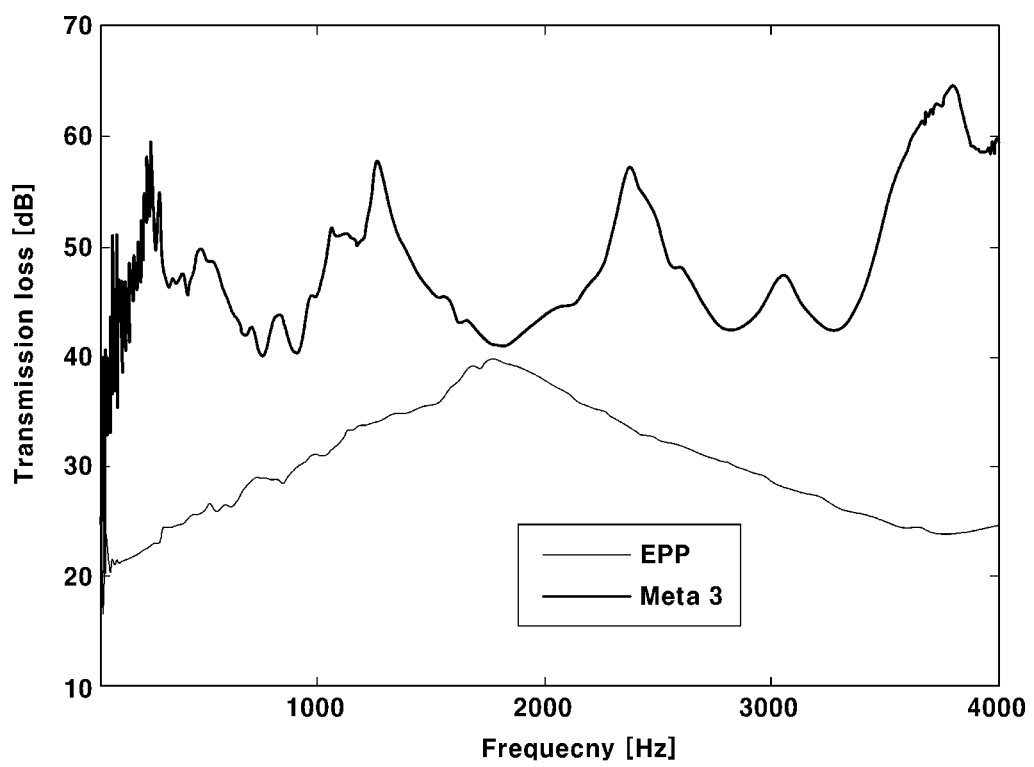
FIG. 9 is a graph showing sound insulation effect data of the device for reducing noise of the present invention compared with the related art.

FIGS. 8 to 9 show data of comparing sound insulation performances of Example 1 and Comparative Example 1.

Comparative Example 1

In Comparative Example 1, a device for reducing noise is configured such that the buffer layer 300 made of a PU (polyurethane) foam is disposed to face a sound source, the sound-absorbing layer 100 is made of a PET felt, and an expanded polypropylene (EPP) layer is disposed between the buffer layer 300 and the sound-absorbing layer 100.

Each of the buffer layer 300, the sound-absorbing layer 100, and the meta-material panel layer 200 constituting Comparative Example 1 is configured to have a thickness of 20 mm so that the device for reducing noise has a thickness of 60 mm.

Example 1

According to Example 1, a device for reducing noise is configured such that the buffer layer 300 made of a PU (polyurethane) foam is disposed to face a sound source, the sound-absorbing layer 100 is made of a PET felt, and a meta-material panel layer (acryl) 200 is disposed between the buffer layer 300 and the sound-absorbing layer 100.

Each of the buffer layer 300, the sound-absorbing layer 100, and the meta-material panel layer 200 is configured to have a thickness of 20 mm so that the device for reducing noise has a thickness of 60 mm.

Further, a block cell 220 having the following numerical values is configured, and the meta-material panel layer 200 configured with four stacked block cells 220 is formed.

TABLE 1

| $2r_c$ | $2r_d$ | $t_c$ | $t_d$ |
|---|---|---|---|
| 130 mm | 1 mm | 3 mm | 1 mm |

A sound insulation effect of a noise cut-off frequency band of the device for reducing noise configured through Example 1 is compared with that of a noise cut-off frequency band of Comparative Example 1 from a noise source spaced by the same distance, and test conditions have a temperature of 20° C., a medium density of 1.21 kg/m$^3$ between the noise source and the device for reducing noise, and a sonic speed of 343 m/s.

As described above, Comparative Example 1 and Example 1 included the same noise source, the devices for reducing noise of Comparative Example 1 and Example 1 were manufactured with respect to a configuration of a floor mat of a vehicle in a state of being spaced from the same noise source and the test was performed, and a graph was drawn on the basis of a loss rate inside the floor mat of the vehicle.

FIG. 8 is a graph of comparing sound insulation effects between Example 1 of the present invention in which the meta-material panel layer 200 is configured with the unit cell 210 and Comparative Example 1 in which the EPP layer is formed of a sound insulation layer under the above-described conditions.

Referring to the graph, it can be seen that the meta-material panel layer 200 configured with the unit cell 210 of the present invention has a sound insulation effect in a frequency band in the range of 200 Hz to 4000 Hz as compared with the EPP layer.

Further, FIG. 9 shows a graph of comparing sound insulation effect data between Example 1 of the device for reducing noise including the meta-material panel layer 200 and Comparative Example 1 of the device for reducing noise including the EPP layer.

As shown in the drawing, the device for reducing noise of Example 1 exhibits that a higher sound insulation effect exists over an entire region of 0 Hz to 4000 Hz as compared with Comparative Example 1.

As described above, the device for reducing noise of the present invention including the meta-material panel layer 200 provides a significant sound insulation effect such that noise introduced from the noise source into indoors can be reduced.

The present invention can obtain the following effects according to a combination of the above-described embodiments and a configuration, which will be described below, and a use relationship.

The present invention provides a device for reducing noise including a sound-absorbing layer and a meta-material panel layer such that an effect of reducing noise introduced from an external sound source into indoors can be achieved.

Further, the present invention has an effect of reducing noise of a frequency band of a selective sound source due to a configuration of a unit cell constituting the meta-material panel layer.

Furthermore, in accordance with the present invention, a thin meta-material panel layer can be formed such that there is provided an effect with on no restriction of the use range.

The foregoing detailed description illustrates the present invention. Further, the foregoing is intended to illustrate and describe the exemplary embodiments of the present invention, and the present invention may be used in various other combinations, modifications, and environments. That is, it is possible to make alternations or modifications without departing from the scope of the present invention disclosed in this disclosure, equivalents, and/or within the technical or knowledge scope in the art to which the present invention pertains. The described embodiments are intended to illustrate the best mode for carrying out the technical spirit of the present invention and various modifications can made in the specific applications and uses of the present invention. Therefore, the detailed description is not intended to limit the present invention as in the disclosed embodiments. Further, it should be construed that the appended claims are intended to include another embodiment.

What is claimed is:

1. A device for reducing noise using a sound meta-material, the device comprising:
   a sound-absorbing layer configured to absorb noise generated from a sound source;
   a buffer layer configured to buffer an impact; and
   a meta-material panel layer disposed between the sound-absorbing layer and the buffer layer, wherein the meta-material panel layer is configured with a unit cell formed by stacking one or more block cells, and one or more unit cells are disposed on a plane of the meta-material panel layer, wherein each block cell includes a center hole and an annular cavity therein, each block cell including a first panel and a third panel, each of which include the center hole, and a second panel disposed between the first panel and the third panel and including an opening for forming the annular cavity.

2. The device of claim 1, further comprising one or more reinforcements disposed at an inner opening of the second panel.

3. The device of claim 1, wherein the unit cell includes a plurality of block cells to allow the center holes of each block cell to coincide with one other.

4. The device of claim 1, wherein a thickness of the meta-material panel layer is 20 mm or less.

5. The device of claim 1, wherein:
   the unit cell is configured with a plurality of block cells; and
   the plurality of block cells are formed to have different physical properties for blocking one or more frequency bands.

6. The device of claim 1, wherein the meta-material panel layer is configured with a plurality of unit cells disposed on the plane of the meta-material panel layer at regular intervals.

7. The device of claim 1, wherein the unit cell is configured with four or more block cells which are stacked in a height direction.

8. The device of claim 1, wherein the sound-absorbing layer is made of polyethylene terephthalate (PET) felt.

9. The device of claim 1, wherein the buffer layer is made of a polyurethane (PU) foam.

10. A device for reducing noise using a sound meta-material, the device comprising:
    a sound-absorbing layer configured to absorb noise generated from a sound source, the sound-absorbing layer being made of polyethylene terephthalate (PET) felt;
    a buffer layer configured to buffer an impact, the buffer layer being made of a polyurethane (PU) foam; and
    a meta-material panel layer disposed between the sound-absorbing layer and the buffer layer, wherein the meta-material panel layer is configured with a unit cell formed by stacking one or more block cells, and one or more unit cells are disposed on a plane of the meta-material panel layer, wherein each block cell includes a center hole and an annular cavity therein, each block cell including a first panel and a third panel, each of which include the center hole, and a second panel disposed between the first panel and the third panel and including an opening for forming the annular cavity.

11. The device of claim 10, further comprising one or more reinforcements disposed at an inner opening of the second panel.

12. The device of claim 10, wherein the center holes of the block cells of each unit cell coincide with one other.

13. The device of claim 10, wherein a thickness of the meta-material panel layer is 20 mm or less.

14. The device of claim 10, wherein the plurality of block cells of the unit cell are formed to have different physical properties for blocking one or more frequency bands.

15. The device of claim 10, wherein the meta-material panel layer is configured with a plurality of unit cells disposed on a plane of the meta-material panel layer at regular intervals.

16. The device of claim 10, wherein the unit cell is configured with four or more block cells that are stacked in a height direction.

17. A device for reducing noise using a sound meta-material, the device comprising:
    a sound-absorbing layer configured to absorb noise generated from a sound source, the sound-absorbing layer being made of polyethylene terephthalate (PET) felt;
    a buffer layer configured to buffer an impact, the buffer layer being made of a polyurethane (PU) foam; and
    a meta-material panel layer disposed between the sound-absorbing layer and the buffer layer;
    wherein the meta-material panel layer is configured with a plurality of unit cells disposed in a plane of the meta-material panel layer at regular intervals;
    wherein each unit cell is formed by stacking one or more block cells, the block cells within each unit cell having different physical properties for blocking different frequency band;
    wherein each block cell includes a center hole and an annular cavity therein;

wherein each block cell includes a first panel and a third panel, which each include the center hole, and a second panel disposed between the first panel and the third panel and including an opening for forming the annular cavity.

18. The device of claim 17, wherein a thickness of the meta-material panel layer is 20 mm or less.

19. The device of claim 17, wherein:
the unit cell is configured with a plurality of block cells; and
the plurality of block cells are formed to have different physical properties for blocking a plurality of frequency bands.

20. The device of claim 19, wherein the sound-absorbing layer is made of polyethylene terephthalate (PET) felt and the buffer layer is made of a polyurethane (PU) foam.

* * * * *